US011927895B2

(12) United States Patent
Sato et al.

(10) Patent No.: US 11,927,895 B2
(45) Date of Patent: Mar. 12, 2024

(54) IMAGE FORMING APPARATUS AND DRUM CARTRIDGE

(71) Applicant: BROTHER KOGYO KABUSHIKI KAISHA, Nagoya (JP)

(72) Inventors: Shougo Sato, Seto (JP); Koji Ogawa, Owariasahi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/166,086

(22) Filed: Feb. 8, 2023

(65) Prior Publication Data

US 2023/0185216 A1 Jun. 15, 2023

Related U.S. Application Data

(63) Continuation of application No. 17/476,173, filed on Sep. 15, 2021, now Pat. No. 11,579,544.

(30) Foreign Application Priority Data

Sep. 25, 2020 (JP) ................................ 2020-161499

(51) Int. Cl.
*G03G 21/16* (2006.01)
*G03G 15/08* (2006.01)
*G03G 21/18* (2006.01)

(52) U.S. Cl.
CPC ..... *G03G 15/0865* (2013.01); *G03G 21/1619* (2013.01); *G03G 21/1633* (2013.01); *G03G 21/1832* (2013.01); *G03G 2221/1869* (2013.01)

(58) Field of Classification Search
CPC ........... G03G 15/0865; G03G 21/1604; G03G 21/1619; G03G 21/1623; G03G 21/1633;
(Continued)

(56) References Cited

U.S. PATENT DOCUMENTS

2009/0142092 A1 6/2009 Sato
2010/0124432 A1 5/2010 Takayama
(Continued)

FOREIGN PATENT DOCUMENTS

JP 2008-90121 A 4/2008
JP 2009-139495 A 6/2009
(Continued)

OTHER PUBLICATIONS

Machine translation of JP 2011-033924 A, Nishiuwatoko et al., (publication date of Feb. 17, 2011) printed on Jun. 27, 2022.

*Primary Examiner* — Sophia S Chen
(74) *Attorney, Agent, or Firm* — Merchant & Gould P.C.

(57) ABSTRACT

A drum cover is movable relative to a photosensitive drum between a first position at which the drum cover covers a part of a circumferential surface of the photosensitive drum, and a second position at which the drum cover does not cover the part of the circumferential surface of the photosensitive drum. A toner cartridge includes a toner storage portion configured to store toner to be supplied to the photosensitive drum. A drum cartridge includes a toner cartridge guide extending in a second direction crossing a first direction. The toner cartridge guide guides the toner cartridge to move in the second direction when the toner cartridge is being attached to the drum cartridge. A distance from the toner cartridge guide to the drum cover at the second position is longer than a distance from the toner cartridge guide to the drum cover at the first position.

18 Claims, 11 Drawing Sheets

(58) Field of Classification Search
CPC ........... G03G 21/1671; G03G 21/1828; G03G 21/1832; G03G 21/1853; G03G 2221/1684; G03G 2221/1869
See application file for complete search history.

(56) References Cited

U.S. PATENT DOCUMENTS

| | | | | |
|---|---|---|---|---|
| 2011/0026966 | A1 | 2/2011 | Ushiozu | |
| 2012/0195628 | A1 | 8/2012 | Kato | |
| 2015/0241840 | A1* | 8/2015 | Kikuchi | G03G 21/1853 399/119 |
| 2019/0025755 | A1* | 1/2019 | Wakamatsu | G03G 21/1832 |
| 2019/0384217 | A1* | 12/2019 | Sato | G03G 21/105 |
| 2021/0389721 | A1 | 12/2021 | Sato | |

FOREIGN PATENT DOCUMENTS

| | | | |
|---|---|---|---|
| JP | 2010-217745 | A | 9/2010 |
| JP | 2011-33924 | A | 2/2011 |
| JP | 2012-155266 | A | 8/2012 |

* cited by examiner

IMAGE FORMING APPARATUS AND DRUM CARTRIDGE

REFERENCE TO RELATED APPLICATIONS

This application is a continuation of U.S. patent application Ser. No. 17/476,173, filed on Sep. 15, 2021, now U.S. Pat. No. 11,579,544 which claims priority from Japanese Patent Application No. 2020-161499 filed on Sep. 25, 2020. The entire content of each of the priority applications is incorporated herein by reference.

BACKGROUND ART

Background

A known image forming apparatus includes a main housing, a drawer, a drum cartridge, and a belt. The drawer is movable between an accommodated position and a pulled-out position. In a state where the drawer is located at the accommodated position, the drawer is accommodated in the main housing. In a state where the drawer is located at the pulled-out position, the drawer is pulled out from the main housing. The drum cartridge has a photosensitive drum. In a state where the drawer is located at the pulled-out position, the drum cartridge is attachable to the drawer.

DESCRIPTION

Summary

According to one aspect, this specification discloses a cartridge. The cartridge includes a drum cartridge and a toner cartridge. The drum cartridge includes a photosensitive drum and a drum cover. The photosensitive drum is rotatable about a first axis extending in a first direction. The drum cover is movable relative to the photosensitive drum between a first position at which the drum cover covers a part of a circumferential surface of the photosensitive drum, and a second position at which the drum cover does not cover the part of the circumferential surface of the photosensitive drum. The toner cartridge includes a toner storage portion configured to store toner to be supplied to the photosensitive drum. The drum cartridge further includes a toner cartridge guide extending in a second direction crossing the first direction. The toner cartridge guide guides the toner cartridge to move in the second direction when the toner cartridge is being attached to the drum cartridge. A distance from the toner cartridge guide to the drum cover at the second position is longer than a distance from the toner cartridge guide to the drum cover at the first position.

According to another aspect, this specification also discloses a cartridge. The cartridge includes a drum cartridge and a toner cartridge. The drum cartridge includes a photosensitive drum and a drum cover. The photosensitive drum is rotatable about a first axis extending in a first direction. The drum cover is movable relative to the photosensitive drum between a first position at which the drum cover covers a part of a circumferential surface of the photosensitive drum, and a second position at which the drum cover does not cover the part of the circumferential surface of the photosensitive drum. The toner cartridge includes a toner storage portion configured to store toner to be supplied to the photosensitive drum. The drum cartridge further includes a holder configured to accommodate the toner cartridge. The holder includes a first drum side plate and a second drum side plate. The first drum side plate is located at a first end of the drum cartridge in the first direction. The second drum side plate is located at a second end of the drum cartridge in the first direction. The toner cartridge is attachable to a space between the first drum side plate and the second drum side plate. A distance from the toner cartridge attached to the space to the drum cover at the second position is longer than a distance from the toner cartridge attached to the space to the drum cover at the first position.

According to still another aspect, this specification also discloses a cartridge. The cartridge includes a drum cartridge and a toner cartridge. The drum cartridge includes a photosensitive drum and a drum cover. The photosensitive drum is rotatable about a first axis extending in a first direction. The drum cover is movable relative to the photosensitive drum between a first position at which the drum cover covers a part of a circumferential surface of the photosensitive drum, and a second position at which the drum cover does not cover the part of the circumferential surface of the photosensitive drum. The toner cartridge includes a toner storage portion configured to store toner to be supplied to the photosensitive drum. The drum cartridge further includes a holder configured to accommodate the toner cartridge. The holder includes a first drum side plate and a second drum side plate. The first drum side plate is located at a first end of the drum cartridge in the first direction. The second drum side plate is located at a second end of the drum cartridge in the first direction. The toner cartridge is attachable to a space between the first drum side plate and the second drum side plate. The toner cartridge moves along a cartridge guide extending in a second direction crossing the first direction while attaching to and detaching from the space between the first drum side plate and the second drum side plate. A distance from the cartridge guide to the drum cover at the second position is longer than a distance from the cartridge guide to the drum cover at the first position.

BRIEF DESCRIPTION OF THE DRAWINGS

Embodiments in accordance with this disclosure will be described in detail with reference to the following figures wherein.

DETAILED DESCRIPTION

In the above image forming apparatus, in a state where the drum cartridge is attached to the drawer and the drawer is located at the pulled-out position, the surface of the photosensitive drum is exposed.

Thus, the surface of the photosensitive drum may be scratched during a replacement operation of the drum cartridge.

In view of the foregoing, an aspect of an objective of this disclosure is to provide an image forming apparatus and a drum cartridge in which the surface of a photosensitive drum is protected in a configuration that a belt is located above the photosensitive drum in a state where the drum cartridge is attached to a drawer and the drawer is located at an accommodated position.

1. Outline of Image Forming Apparatus 1

The outline of an image forming apparatus 1 will be described with reference to FIGS. 1 to 3.

Figure 1:
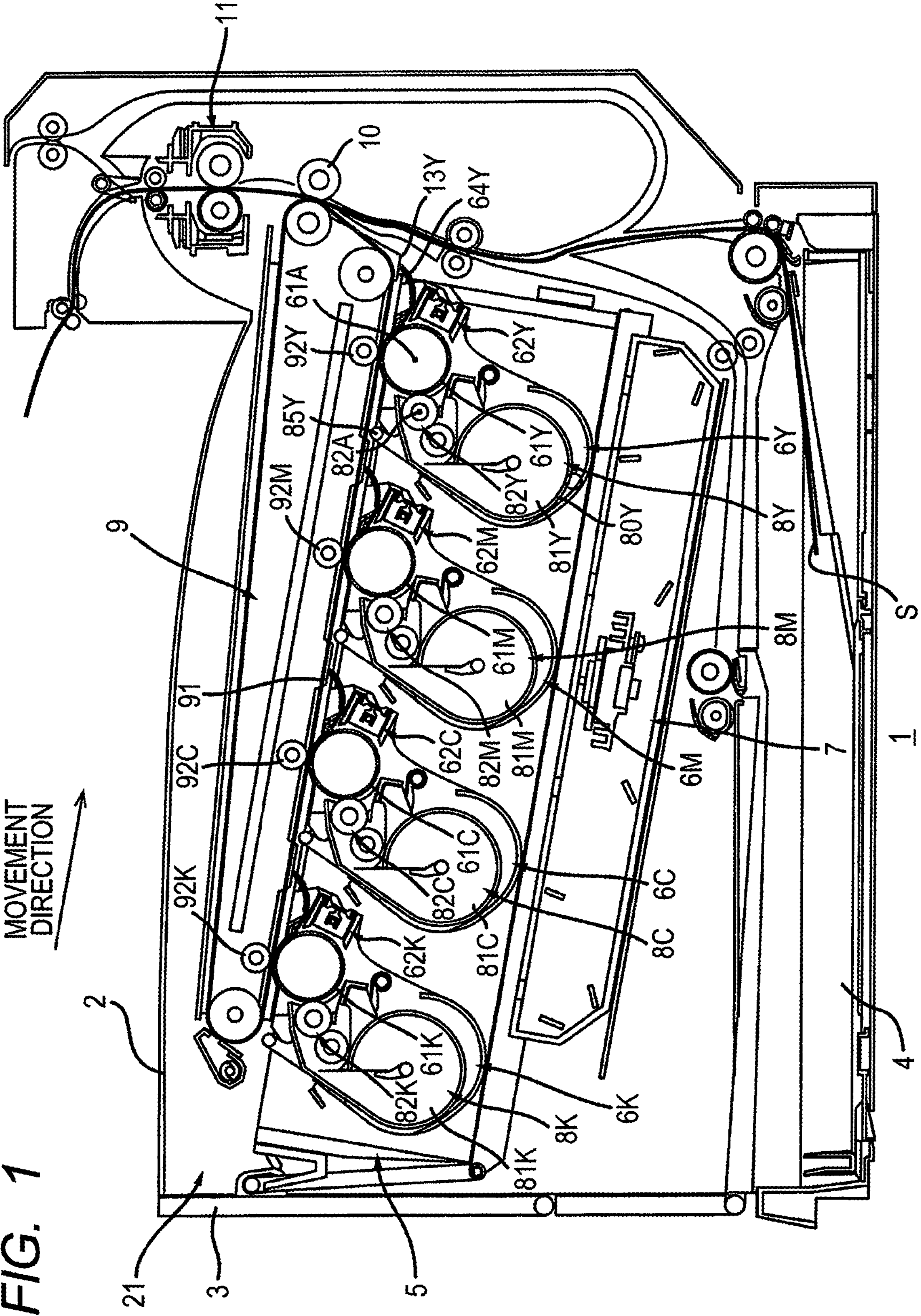
FIG. 1 is a diagram showing a schematic configuration of an image forming apparatus.

As shown in FIG. 1, the image forming apparatus 1 includes a main housing 2, a cover 3, a sheet accommodating portion 4, a drawer 5, a plurality of drum cartridges 6Y, 6M, 6C, 6K, an exposure device 7, a plurality of toner cartridges 8Y, 8M, 8C, 8K, a belt unit 9, a transfer roller 10, and a fixing device 11.

1.1 Main housing 2

The main housing 2 accommodates the sheet accommodating portion 4, the drawer 5, the plurality of drum cartridges 6Y, 6M, 6C, 6K, the exposure device 7, the plurality of toner cartridges 8Y, 8M, 8C, 8K, the belt unit 9, the transfer roller 10, and the fixing device 11. The main housing 2 has an opening 21.

1.2 Cover 3

Figure 2:
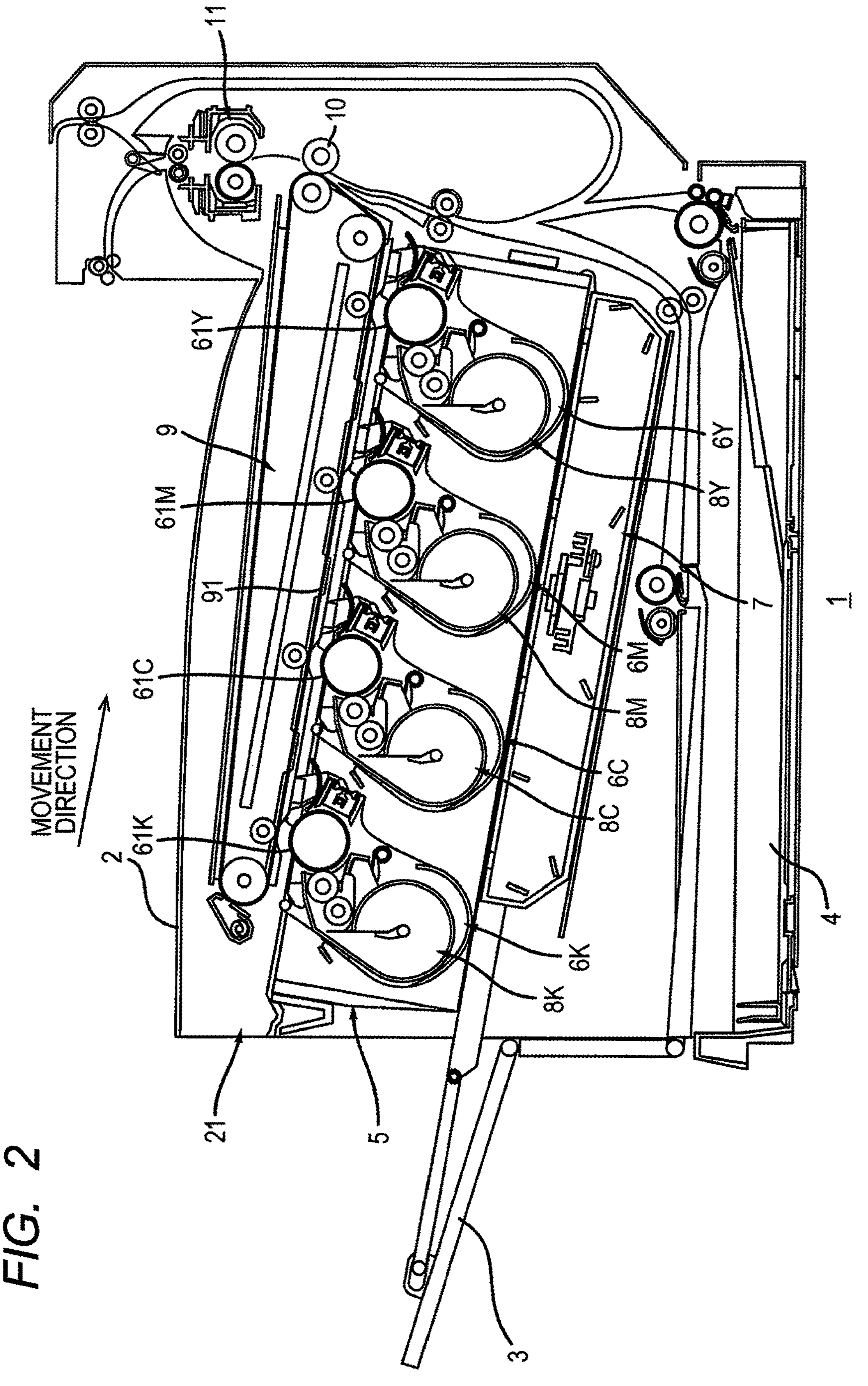
FIG. 2 shows the image forming apparatus shown in FIG. 1, in which a cover is located at an open position and a drawer is located at a second accommodated position.

The cover 3 is movable between a closed position (see FIG. 1) and an open position (see FIG. 2). As shown in FIG. 1, when the cover 3 is located at the closed position, the cover 3 closes the opening 21. As shown in FIG. 2, when the cover 3 is located at the open position, the opening 21 opens.

1.3 Sheet Accommodating Portion 4

As shown in FIG. 1, the sheet accommodating portion 4 accommodates a sheet S. The sheet S in the sheet accommodating portion 4 is conveyed toward the transfer roller 10.

1.4 Drawer 5

Figure 3:
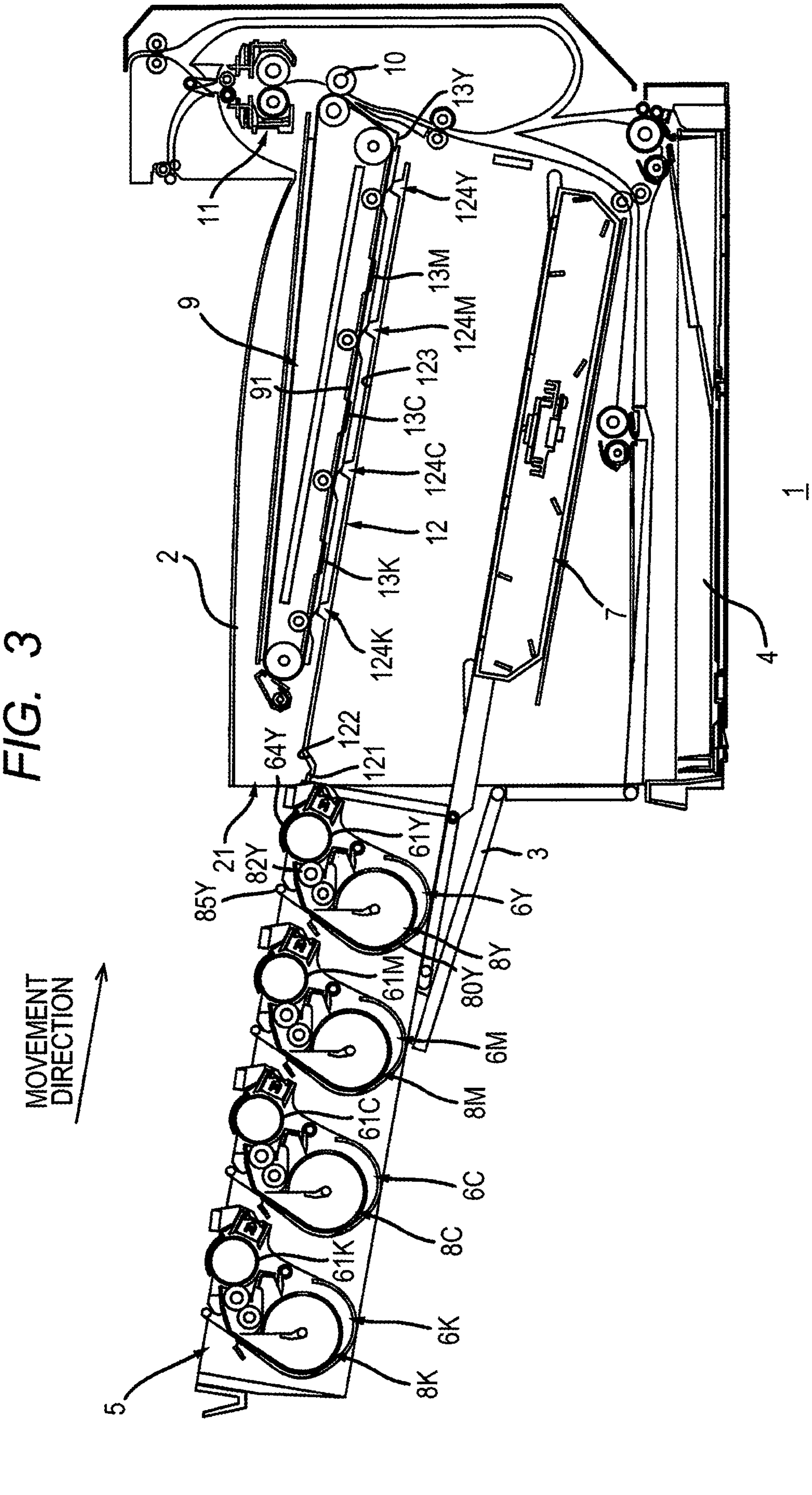
FIG. 3 shows the image forming apparatus shown in FIG. 1, in which the cover is located at the open position and the drawer is located at a pulled-out position.

As shown in FIGS. 1 to 3, the drawer 5 is movable between an accommodated position (see FIG. 1) and a pulled-out position (see FIG. 3).

Specifically, as shown in FIGS. 1 and 2, the drawer 5 moves from the accommodated position (see FIG. 1) to a second accommodated position (see FIG. 2) in conjunction with the movement of the cover 3 from the closed position (see FIG. 1) to the open position (see FIG. 2). In a state where the cover 3 is located at the closed position, the drawer 5 is located at the accommodated position. In a state where the cover 3 is located at the open position, the drawer 5 is located at the second accommodated position. In a state where the drawer 5 is located at the accommodated position or the second accommodated position, the entirety of the drawer 5 is accommodated in the main housing 2. When the drawer 5 moves from the accommodated position to the second accommodated position, the drawer 5 moves away from the belt unit 9.

The drawer 5 moves from the second accommodated position (see FIG. 2) to the accommodated position (see FIG. 1) in conjunction with the movement of the cover 3 from the open position (see FIG. 2) to the closed position (see FIG. 1). When the drawer 5 moves from the second accommodated position to the accommodated position, the drawer 5 moves closer to the belt unit 9.

As shown in FIGS. 2 and 3, in a state where the cover 3 is located at the open position, the drawer 5 is movable through the opening 21 between the second accommodated position (see FIG. 2) and the pulled-out position (see FIG. 3). The drawer 5 is movable in the direction in which photosensitive drums 61Y, 61M, 61C, and 61K (see FIG. 1) are aligned. The photosensitive drum 61Y, 61M, 61C, and 61K will be described later. As shown in FIG. 3, in a state where the cover 3 is located at the open position and the drawer 5 is located at the pulled-out position, at least part of the drawer 5 is pulled out from the main housing 2.

1.5 Drum cartridges 6Y, 6M, 6C, 6K

In a state where the drawer 5 is located at the pulled-out position, each of the drum cartridges 6Y, 6M, 6C, and 6K is attachable to the drawer 5. In a state where the drum cartridges 6Y, 6M, 6C, and 6K are attached to drawer 5 and the drawer 5 is located at the pulled-out position, each of the drum cartridges 6Y, 6M, 6C, and 6K is detachable from the drawer 5.

As shown in FIG. 1, the drum cartridge 6Y has the photosensitive drum 61Y and a charger 62Y. The drum cartridge 6M has the photosensitive drum 61M and a charger 62M. The drum cartridge 6C has the photosensitive drum 61C and a charger 62C. The drum cartridge 6K has the photosensitive drum 61K and a charger 62K.

The photosensitive drum 61Y is rotatable about a first axis 61A. The first axis 61A extends in the first direction. The photosensitive drum 61Y extends in the first direction.

The charger 62Y charges the photosensitive drum 61Y. The charger 62Y is a scorotron type. The charger 62Y may be a charging roller. In a state where the drum cartridge 6Y is attached to the drawer 5 and the drawer 5 is located at the accommodated position, the charger 62Y is located downstream of the photosensitive drum 61Y in a movement direction in which the drawer 5 moves from the pulled-out position toward the accommodated position.

Each of the drum cartridge 6M, 6C, and 6K is described in the same manner as the drum cartridge 6Y. Thus, the description of the drum cartridges 6M, 6C, and 6K is omitted.

1.6 Exposure Device 7

In a state where the drawer 5 is located at the accommodated position, the exposure device 7 is located below the drawer 5. In a state where drawer 5 is located at the accommodated position, the exposure device 7 is located between the sheet accommodating portion 4 and the drawer 5. In a state where the drum cartridges 6Y, 6M, 6C, and 6K are attached to the drawer 5 and the drawer 5 is located at the accommodated position, the exposure device 7 exposes the circumferential surface of each of the photosensitive drums 61Y, 61M, 61C, and 61K. In this example, the exposure device 7 is a laser scan unit. The exposure device may be an exposure head having an LED array.

1.7 Toner Cartridges 8Y, 8M, 8C, 8K

In a state where the drum cartridge 6Y is detached from the drawer 5, the toner cartridge 8Y is attachable to the drum cartridge 6Y. In a state where the toner cartridge 8Y is attached to the drum cartridge 6Y and the drum cartridge 6Y is detached from the drawer 5, the toner cartridge 8Y is detachable from the drum cartridge 6Y. In a state where the toner cartridge 8Y is attached to the drum cartridge 6Y and the drum cartridge 6Y is attached to the drawer 5, the toner cartridge 8Y is not detachable from the drum cartridge 6Y.

The toner cartridge 8Y has a toner storage portion 81Y and a development roller 82Y. The toner cartridge 8M has a toner storage portion 81M and a development roller 82M. The toner cartridge 8C has a toner storage portion 81C and a development roller 82C. The toner cartridge 8K has a toner storage portion 81K and a development roller 82K.

The toner storage portion 81Y stores the toner to be supplied to the photosensitive drum 61Y. In other words, the toner cartridge 8Y accommodates the toner to be supplied to the photosensitive drum 61Y. In a state where the toner cartridge 8Y is attached to the drum cartridge 6Y and the drum cartridge 6Y is attached to the drawer 5, the toner storage portion 81Y is located at a lower position than the development roller 82Y. In a state where the toner cartridge 8Y is attached to the drum cartridge 6Y and the drum cartridge 6Y is attached to the drawer 5, the toner storage portion 81Y is located at a lower position than the photosensitive drum 61Y.

The development roller 82Y supplies the toner in the toner cartridge 8Y to the photosensitive drum 61Y. In a state where the toner cartridge 8Y is attached to the drum cartridge 6Y, the development roller 82Y contacts the photosensitive drum 61Y. The development roller 82Y may be configured to separate from the photosensitive drum 61Y. In a state where the toner cartridge 8Y is attached to the drum cartridge 6Y, the development roller 82Y extends in the first direction. The development roller 82Y is rotatable about an axis 82A. In a state where the toner cartridge 8Y is attached to the drum cartridge 6Y, the axis 82A extends in the first direction. In a state where the toner cartridge 8Y is attached to the drum cartridge 6Y and the drum cartridge 6Y is attached to the drawer 5 and the drawer 5 is located at the accommodated position, the development roller 82Y is located upstream of the photosensitive drum 61Y in the movement direction in which the drawer 5 moves from the pulled-out position toward the accommodated position. In other words, in a state where the toner cartridge 8Y is attached to the drum cartridge 6Y and the drum cartridge 6Y is attached to the drawer 5 and the drawer 5 is located at the accommodated position, the development roller 82Y is located at the opposite side of the charger 62Y with respect to the photosensitive drum 61Y in the direction in which the photosensitive drum 61Y, 61M, 61C, and 61K are aligned.

Each of the toner cartridges 8M, 8C, and 8K is described in the same manner as the toner cartridge 8Y. Thus, the description of the toner cartridges 8M, 8C, and 8K will be omitted.

1.8 Belt Unit 9

In a state where the drum cartridges 6Y, 6M, 6C, and 6K are attached to the drawer 5 and the drawer 5 is located at the accommodated position, the belt unit 9 is located above the photosensitive drums 61Y, 61M, 61C, and 61K. The belt unit 9 includes a belt 91 and a plurality of transfer rollers 92Y, 92M, 92C, and 92K. That is, the image forming apparatus 1 includes the belt 91.

The belt 91 is an intermediate transfer belt. In a state where the drum cartridges 6Y, 6M, 6C, 6K are attached to the drawer 5 and the drawer 5 is located at the accommodated position, the belt 91 is located above the photosensitive drums 61Y, 61M, 61C, and 61K. In a state where the drum cartridges 6Y, 6M, 6C, and 6K are attached to the drawer 5 and the drawer 5 is located at the accommodated position, the photosensitive drums 61Y, 61M, 61C, and 61K contact the belt 91. As shown in FIG. 2, in a state where the drum cartridges 6Y, 6M, 6C, and 6K are attached to the drawer 5 and the drawer 5 is located at the second accommodated position, the photosensitive drums 61Y, 61M, 61C, and 61K are separated from the belt 91.

As shown in FIG. 1, in a state where the drum cartridge 6Y, 6M, 6C, and 6K are attached to the drawer 5 and the drawer 5 is located at the accommodated position, the transfer roller 92Y transfers the toner on the photosensitive drum 61Y to the belt 91. The transfer roller 92M transfers the toner on the photosensitive drum 61M to the belt 91. The transfer roller 92C transfers the toner on the photosensitive drum 61C to the belt 91. The transfer roller 92K transfers the toner on the photosensitive drum 61K to the belt 91.

1.9 Transfer Roller 10

The transfer roller 10 contacts the belt 91. The sheet S in the sheet accommodating portion 4 passes between the belt 91 and the transfer roller 10. At this time, the transfer roller 10 transfers the toner on the belt 91 to the sheet S.

1.10 Fixing Device 11

The fixing device 11 heats and pressurizes the sheet S on which the toner is transferred to fix the toner on the sheet S. The sheet S that has passed through the fixing device 11 is discharged onto the upper surface of the main housing 2.

2. Details of Drum Cartridge 6Y

The details of the drum cartridge 6Y will be described with reference to FIGS. 4 to 6.

Figure 4:
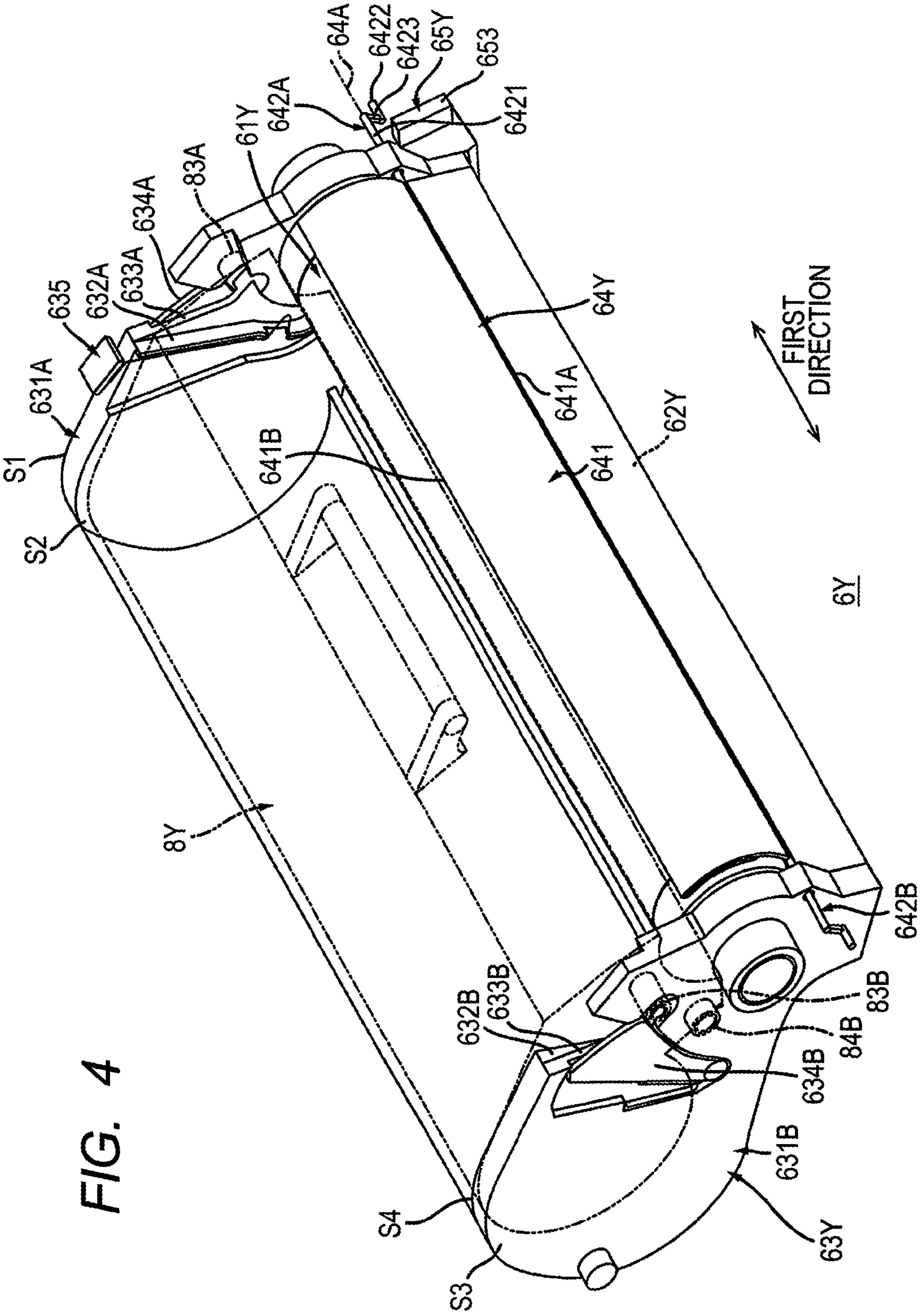
FIG. 4 is a perspective view of a drum cartridge, showing a state where a drum cover is located at a first position.

As shown in FIG. 4, the drum cartridge 6Y includes a drum frame 63Y, a drum cover 64Y, and a wire cleaner 65Y, in addition to the above-mentioned photosensitive drum 61Y and the charger 62Y.

2.1 Drum Frame 63Y

The drum frame 63Y supports the photosensitive drum 61Y and the charger 62Y. In a state where the toner cartridge 8Y is attached to the drum cartridge 6Y, the drum frame 63Y supports the toner cartridge 8Y. The drum frame 63Y includes two drum side plates 631A and 631B, two toner cartridge guides 632A and 632B, two toner cartridge guides 633A and 633B, two pressing members 634A and 634B, and a lock lever 635.

2.1.1 Drum Side Plates 631A, 631B

The drum side plate 631A is located at one end of the drum cartridge 6Y in the first direction. The drum side plate 631A extends in a direction that crosses the first direction. For example, the drum side plate 631A extends in a direction perpendicular to the first direction. The drum side plate 631A has an outer surface S1 and an inner surface S2 in the first direction. The inner surface S2 is located between the outer surface S1 and the drum side plate 631B in the first direction.

The drum side plate 631B is located at an other end of the drum cartridge 6Y in the first direction. The drum side plate 631B is located away from the drum side plate 631A in the first direction. In a state where the toner cartridge 8Y is attached to the drum cartridge 6Y, the toner cartridge 8Y is located between the drum side plate 631A and the drum side plate 631B in the first direction. The drum side plate 631B extends in a direction that crosses the first direction. For example, the drum side plate 631B extends in a direction perpendicular to the first direction. The drum side plate 631B has an outer surface S3 and an inner surface S4 in the first direction. The inner surface S4 is located between the outer surface S3 and the drum side plate 631A in the first direction.

2.1.2 Toner Cartridge Guides 632A, 632B

The toner cartridge guides 632A is located at the inner surface S2 of the drum side plate 631A. The toner cartridge guide 632A extends in a direction crossing the first direction. For example, the toner cartridge guide 632A extends in a direction perpendicular to the first direction. In a state where the toner cartridge 8Y is attached to the drum cartridge 6Y, a protrusion 84A (see FIG. 5A) of the toner cartridge 8Y fits in the toner cartridge guide 632A. The protrusion 84A will be described later. The toner cartridge guide 632A is a groove. The toner cartridge guide 632A may be a rib.

The toner cartridge guide 632B is located at the inner surface S4 of the drum side plate 631B. The toner cartridge guide 632B extends in a direction crossing the first direction. For example, the toner cartridge guide 632B extends in a direction perpendicular to the first direction. In a state where the toner cartridge 8Y is attached to the drum cartridge 6Y, a protrusion 84B of the toner cartridge 8Y fits in the toner cartridge guide 632B. The protrusion 84B will be described later. The toner cartridge guide 632B is a groove. The toner cartridge guide 632B may be a rib.

2.1.3 Toner Cartridge Guides 633A, 633B

The toner cartridge guide 633A is provided at the drum side plate 631A. The toner cartridge guide 633A is located at the opposite side of the drum side plate 631B with respect to the toner cartridge guide 632A in the first direction. The toner cartridge guide 633A is located between the toner cartridge guide 632A and the outer surface S1 of the drum side plate 631A in the first direction.

The toner cartridge guide 633A extends in a direction crossing the first direction. For example, the toner cartridge guide 633A extends in a direction perpendicular to the first direction. The toner cartridge guide 633A extends in a direction crossing the toner cartridge guide 632A. A part of the toner cartridge guide 633A overlaps the toner cartridge guide 632A as viewed in the first direction.

In a state where the toner cartridge 8Y is attached to the drum cartridge 6Y, a protrusion 83A of the toner cartridge 8Y fits in the toner cartridge guide 633A. The protrusion 83A will be described later. The toner cartridge guide 633A is a groove. The toner cartridge guide 633A may be a rib.

The toner cartridge guide 633B is provided at the drum side plate 631B. The toner cartridge guide 633B is located at the opposite side of the drum side plate 631A with respect to the toner cartridge guide 632B in the first direction. The toner cartridge guide 633B is located between the toner cartridge guide 632B and the outer surface S3 of the drum side plate 631B in the first direction.

The toner cartridge guide 633B extends in a direction crossing the first direction. For example, the toner cartridge guide 633B extends in a direction perpendicular to the first direction. The toner cartridge guide 633B extends in a direction crossing the toner cartridge guide 632B. A part of the toner cartridge guide 633B overlaps the toner cartridge guide 632B as viewed in the first direction.

In a state where the toner cartridge 8Y is attached to the drum cartridge 6Y, a protrusion 83B of the toner cartridge 8Y fits in the toner cartridge guide 633B. The protrusion 83B will be described later. The toner cartridge guide 633B is a groove. The toner cartridge guide 633B may be a rib.

2.1.4 Pressing Members 634A, 634B

The pressing member 634A is located at the outer surface S1 of the drum side plate 631A. In a state where the toner cartridge 8Y is attached to the drum cartridge 6Y, the pressing member 634A presses the protrusion 83A of the toner cartridge 8Y toward the photosensitive drum 61Y.

The pressing member 634B is located at the outer surface S3 of the drum side plate 631B. In a state where the toner cartridge 8Y is attached to the drum cartridge 6Y, the pressing member 634B presses the protrusion 83B of the toner cartridge 8Y toward the photosensitive drum 61Y.

In a state where the toner cartridge 8Y is attached to the drum cartridge 6Y, the pressing member 634A presses the protrusion 83A and the pressing member 634B presses the protrusion 83B, which causes the development roller 82Y (see FIG. 1) to be pressed toward the photosensitive drum 61Y.

2.1.5 Lock Lever 635

Figure 5A:
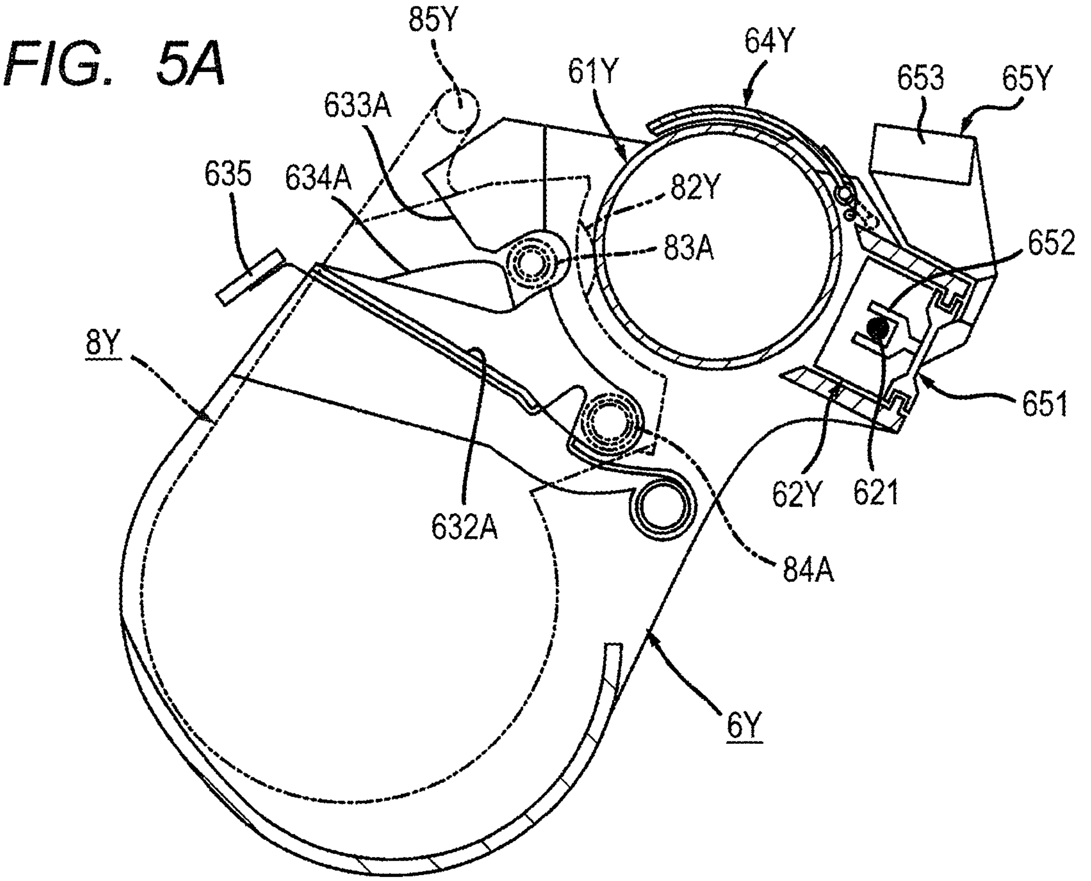
FIG. 5A is a cross-sectional view of the drum cartridge shown in FIG. 4, showing a state where a lock lever is located at a lock position.
Figure 5B:
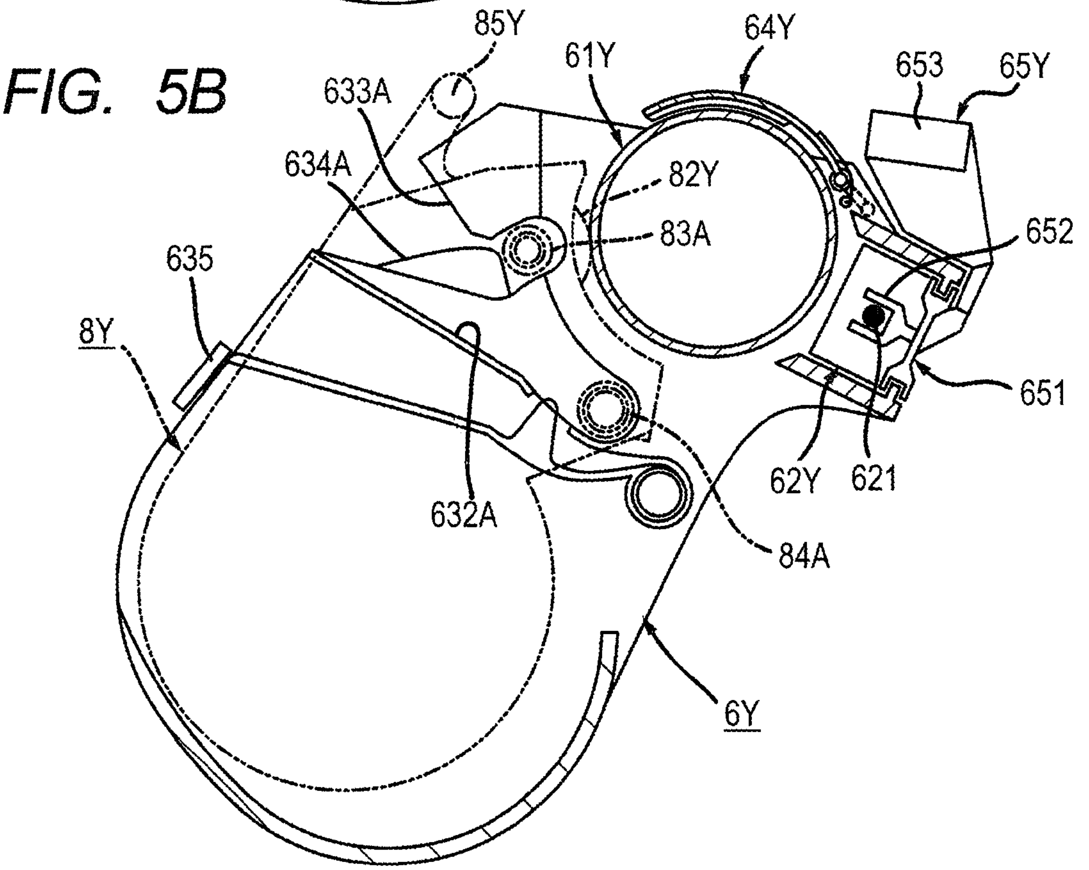
FIG. 5B shows the drum cartridge shown in FIG. 5A, showing a state where the lock lever is located at a lock release position.

The lock lever 635 is located at the inner surface S2 of the drum side plate 631A. As shown in FIGS. 5A and 5B, the lock lever 635 is movable between a lock position (see FIG. 5A) and a lock release position (see FIG. 5B).

As shown in FIG. 5A, in a state where the toner cartridge 8Y is attached to the drum cartridge 6Y and the lock lever 635 is located at the lock position, the lock lever 635 locks the toner cartridge 8Y on the drum cartridge 6Y. Here, locking the toner cartridge 8Y on the drum cartridge 6Y means a state where the toner cartridge 8Y does not separate from the drum cartridge 6Y.

As shown in FIG. 5B, in a state where the toner cartridge 8Y is attached to the drum cartridge 6Y and the lock lever 635 is located at the lock release position, lock of the toner cartridge 8Y on the drum cartridge 6Y is released.

2.2 Drum Cover 64Y

Figure 6:
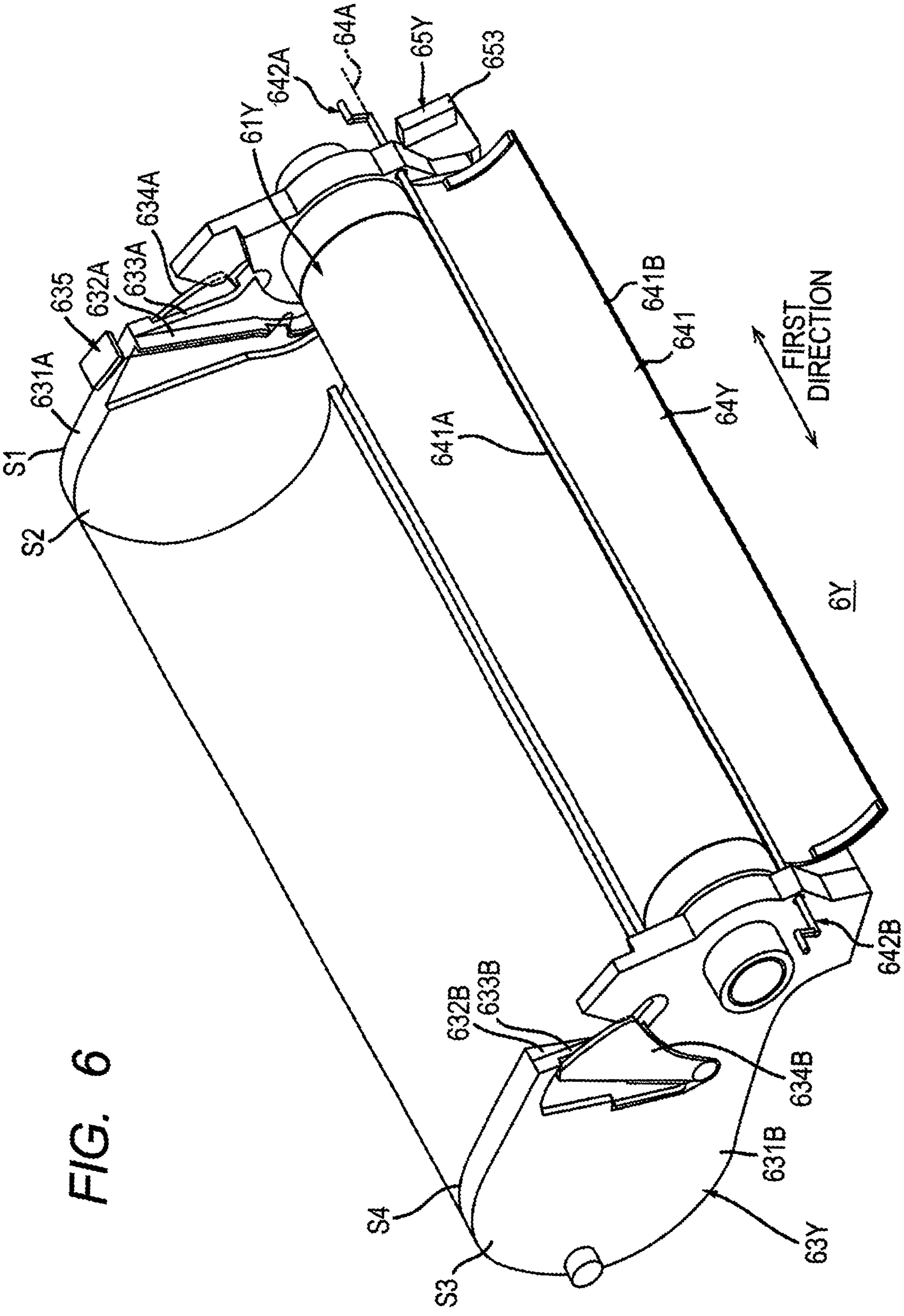
FIG. 6 is a perspective view of the drum cartridge shown in FIG. 4, showing a state where the drum cover is located at a second position.

As shown in FIGS. 4 and 6, the drum cover 64Y is movable between a first position (see FIG. 4) and a second position (see FIG. 6) relative to the photosensitive drum 61Y. The drum cover 64Y is rotatable about a second axis 64A between the first position and the second position. The second axis 64A extends in the first direction.

As shown in FIG. 4, in a state where the drum cover 64Y is located at the first position, the drum cover 64Y covers a part of the circumferential surface of the photosensitive drum 61Y. In a state where the toner cartridge 8Y is attached to the drum cartridge 6Y and the drum cover 64Y is located at the first position, the drum cover 64Y is located between the charger 62Y and the toner cartridge 8Y. In a state where the toner cartridge 8Y is attached to the drum cartridge 6Y and the drum cover 64Y is located at the first position, the drum cover 64Y is located between the charger 62Y and the development roller 82Y (see FIG. 3).

As shown in FIG. 6, in a state where the drum cover 64Y is located at the second position, the drum cover 64Y does not cover a part the circumferential surface of the photosensitive drum 61Y. In a state where the toner cartridge 8Y is attached to the drum cartridge 6Y and the drum cover 64Y is located at the second position, the drum cover 64Y is located at the opposite side of the toner cartridge 8Y (see FIG. 1) with respect to the photosensitive drum 61Y. In a state where the toner cartridge 8Y is attached to the drum cartridge 6Y and the drum cover 64Y is located at the second position, the drum cover 64Y is located at the opposite side of the development roller 82Y (see FIG. 1) with respect to the photosensitive drum 61Y.

As shown in FIG. 4, the drum cover 64Y includes a cover main body 641, and two arms 642A and 642B.

2.2.1 Cover Main Body 641

In a state where the drum cover 64Y is located at the first position, the cover main body 641 covers a part of the circumferential surface of the photosensitive drum 61Y. The cover main body 641 extends in the first direction. In a state where the drum cover 64Y is located at the first position, the cover main body 641 extends along the circumferential surface of the photosensitive drum 61Y. In a state where the drum cover 64Y is located at the first position, the cover main body 641 has a first end 641A and a second end 641B in the circumferential direction of the photosensitive drum 61Y. In a state where the drum cover 64Y is located at the first position, the first end 641A is located between the second end 641B and the charger 62Y. In a state where the drum cover 64Y is located at the first position, the second end 641B is located between the first end 641A and the toner cartridge 8Y. The drum cover 64Y is rotationally movable about the first end 641A of the cover main body 641 between the first position (see FIG. 4) and the second position (see FIG. 6).

2.2.2 Arm 642A

The arm 642A is located at one end of the cover main body 641 in the first direction. The arm 642A is located at the first end 641A of the cover main body 641. The arm 642A is rotatable together with the cover main body 641 about the second axis 64A. The arm 642A extends in the first direction. The arm 642A has a crank shape. More specifically, the arm 642A includes a shaft 6421, a protrusion 6422, and a connecting portion 6423.

The shaft 6421 is connected to the one end of the cover main body 641 in the first direction. The shaft 6421 extends in the first direction. The shaft 6421 extends along the second axis 64A. The shaft 6421 has a circular columnar shape.

The protrusion 6422 is located away from the shaft 6421 in a direction crossing the first direction. The protrusion 6422 extends in the first direction. The protrusion 6422 has a circular columnar shape.

The connecting portion 6423 connects the shaft 6421 and the protrusion 6422 to each other. The connecting portion 6423 is located between the shaft 6421 and the protrusion 6422. The connecting portion 6423 extends in the direction crossing the first direction.

2.2.3 Arm 642B

The arm 642B is located at the other end of the cover main body 641 in the first direction. The description of the arm 642A is also applied to the arm 642B. Thus, the description of the arm 642B will be omitted.

2.3 Wire Cleaner 65Y

As shown in FIG. 5A, the wire cleaner 65Y cleans a wire 621 of the charger 62Y. The wire 621 extends in the first direction. In a state where the drum cover 64Y is located at the first position, the wire cleaner 65Y is movable in the first direction from a standby position (see FIG. 4). The wire cleaner 65Y includes a slider 651, a cleaning member 652, and a handle 653.

2.3.1 Slider 651

The slider 651 is movable in the first direction. In other words, the slider 651 is movable in a direction in which the wire 621 extends. The slider 651 is supported by the drum frame 63Y. The slider 651 supports the cleaning member 652.

2.3.2 Cleaning Member 652

The cleaning member 652 is used for cleaning the wire 621. The cleaning member 652 contacts the wire 621. The cleaning member 652 is sponge, for example. The cleaning member 652 may be nonwoven fabric. The cleaning member 652 is movable together with the slider 651 in the first direction.

2.3.3 Handle 653

The handle 653 is connected to the slider 651. The handle 653 is movable in the first direction together with the slider 651. The handle 653 is grasped by an operator to clean the wire 621. In a state where the drum cartridge 6Y is attached to the drawer 5, the handle 653 is located at a higher position than the charger 62Y. Thus, when the drawer 5 is located at the pulled-out position, the operator is allowed to grasp the handle 653 and move the wire cleaner 65Y without the need of detaching the drum cartridge 6Y from the drawer 5. This facilitates cleaning of the wire 621 by the operator.

As shown in FIG. 4, in a state where the wire cleaner 65Y is located at the standby position, the handle 653 of the wire cleaner 65Y is located closer to one side (an outer side) than the drum cover 64Y in the first direction. As shown in FIG. 6, in a state where the drum cover 64Y is located at the second position and the wire cleaner 65Y is located at the standby position, the handle 653 of the wire cleaner 65Y is aligned with the drum cover 64Y in the first direction. Thus, if the drum cover 64Y moves from the first position toward the second position in a state where the wire cleaner 65Y is not returned to the standby position, the drum cover 64Y hits against the handle 653 of the wire cleaner 65Y and stops before reaching the second position. This allows the operator to be notified of a state where the wire cleaner 65Y is not returned to the standby position. As a result, it becomes unlikely that the drum cartridge 6Y is used for image formation in a state where the wire cleaner 65Y is not returned to the standby position.

3. Detail of Toner Cartridge 8Y

Figure 7:
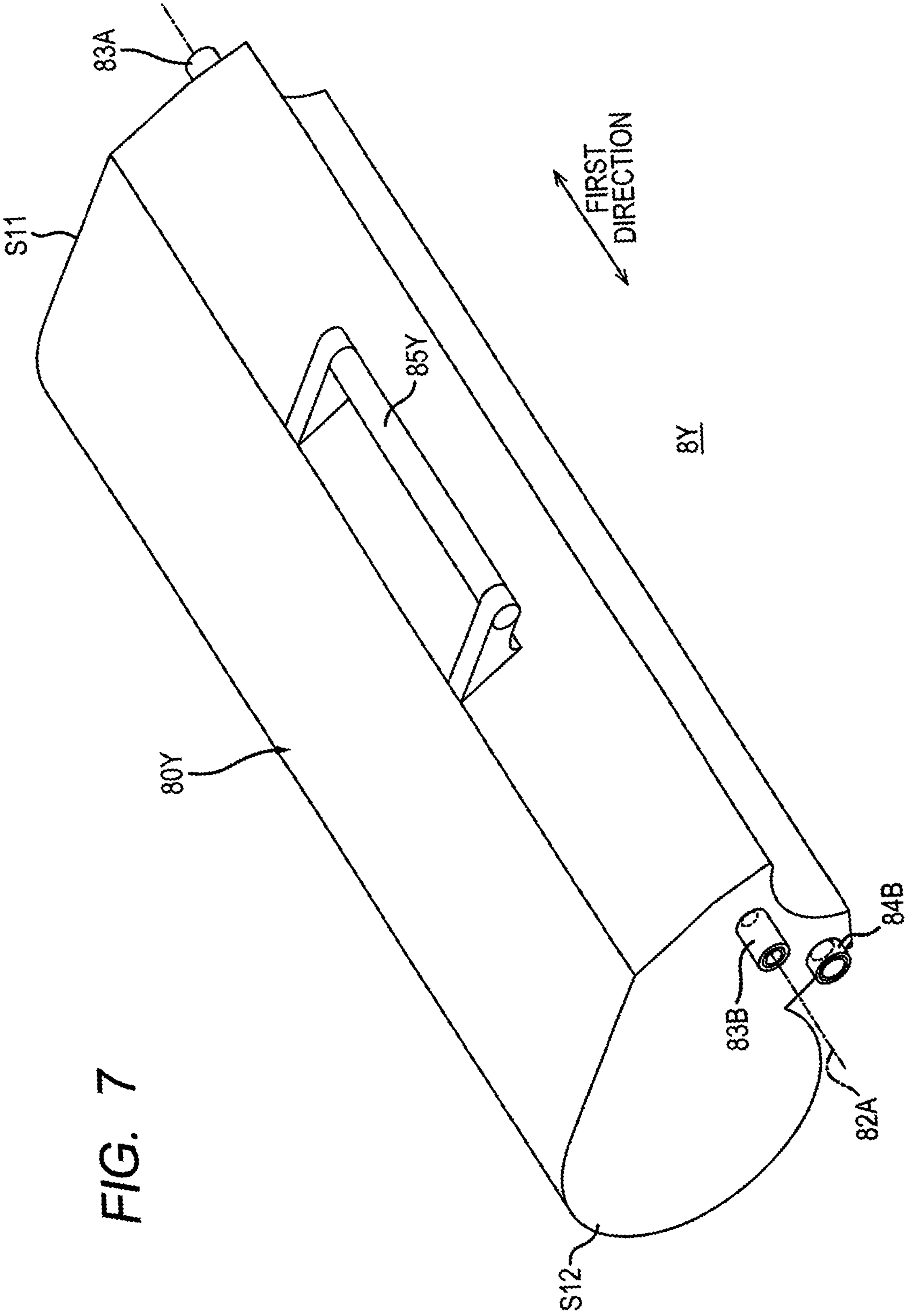
FIG. 7 is a perspective view of a toner cartridge.

The toner cartridge 8Y will be described next in detail by referring to FIG. 7.

The toner cartridge 8Y includes a toner housing 80Y, the two protrusions 83A and 83B, the two protrusions 84A (see FIG. 5A) and 84B, and a toner handle 85Y, in addition to the development roller 82Y described above.

3.1 Toner Housing 80Y

The toner housing 80Y includes the toner storage portion 81Y described above. The toner housing 80Y extends in the direction in which the axis 82A extends. The toner housing 80Y has one outer surface S11 and an other outer surface S12 in the direction in which the axis 82A extends.

3.2 Protrusions 83A, 83B

The protrusion 83A is located at the outer surface S11 of the toner housing 80Y. The protrusion 83A extends in the first direction. The protrusion 83A extends along the axis 82A. The protrusion 83A extends from the outer surface S11 of the toner housing 80Y. The protrusion 83A may be attached to the outer surface S11 of the toner housing 80Y. The protrusion 83A may be a shaft of the development roller 82Y. In a state where the toner cartridge 8Y is attached to the drum cartridge 6Y, the protrusion 83A fits in the toner cartridge guide 633A (see FIG. 4).

The protrusion 83B is located at the outer surface S12 of the toner housing 80Y. The protrusion 83B extends in the first direction. The protrusion 83B extends along the axis 82A. The protrusion 83B extends from the outer surface S12 of the toner housing 80Y. The protrusion 83B may be attached to the outer surface S12 of the toner housing 80Y. The protrusion 83B may be a shaft of the development roller 82Y. In a state where the toner cartridge 8Y is attached to the drum cartridge 6Y, the protrusion 83B fits in the toner cartridge guide 633B (see FIG. 4).

3.3 Protrusions 84A, 84B

The protrusion 84A (see FIG. 5A) is located at the outer surface S11 of the toner housing 80Y. The protrusion 84A is located away from the protrusion 83A. The protrusion 84A extends in the first direction. The protrusion 84A extends from the outer surface S11 of the toner housing 80Y. The protrusion 84A may be attached to the outer surface S11 of the toner housing 80Y. In a state where the toner cartridge 8Y is attached to the drum cartridge 6Y, the protrusion 84A fits in the toner cartridge guide 632A (see FIG. 5A).

The protrusion 84B is located at the outer surface S12 of the toner housing 80Y. The protrusion 84B is located away from the protrusion 83B. The protrusion 84B extends in the first direction. The protrusion 84B extends from the outer surface S12 of the toner housing 80Y. The protrusion 84B may be attached to the outer surface S12 of the toner housing 80Y. In a state where the toner cartridge 8Y is attached to the drum cartridge 6Y, the protrusion 84B fits in the toner cartridge guide 632B (see FIG. 4).

3.4 Toner Handle 85Y

The toner handle 85Y is located at a central part of the toner housing 80Y in the direction in which the axis 82A extends. The toner handle 85Y is located between the outer surface S11 and the outer surface S12 in the direction in which the axis 82A extends. The toner handle 85Y extends from the toner housing 80Y. The toner handle 85Y may be attached to the toner housing 80Y. The operator can carry the toner cartridge 8Y while grasping the toner handle 85Y.

As shown in FIG. 5A, the toner handle 85Y is located at the opposite side of the protrusion 84A with respect to the protrusion 83A in a direction crossing the axis 82A. In a state where the toner cartridge 8Y is attached to the drum cartridge 6Y, the toner handle 85Y is located at the opposite side of the charger 62Y with respect to the photosensitive drum 61Y.

As shown in FIG. 3, in a state where the toner cartridge 8Y is attached to the drum cartridge 6Y and the drum cartridge 6Y is attached to the drawer 5, the toner handle 85Y is located at a higher position than the development roller 82Y. In a state where the toner cartridge 8Y is attached to the drum cartridge 6Y and the drum cartridge 6Y is attached to the drawer 5, the toner handle 85Y is located at a higher position than the toner housing 80Y. Thus, a user is allowed to grasp the toner handle 85Y easily in a state where the drawer 5 is located at the pulled-out position. Then, by grasping the toner handle 85Y and pulling the toner cartridge 8Y out of the drawer 5, the user becomes capable of detaching the drum cartridge 6Y together with the toner cartridge 8Y from the drawer 5.

As shown in FIG. 1, in a state where the toner cartridge 8Y is attached to the drum cartridge 6Y and the drum cartridge 6Y is attached to the drawer 5 and the drawer 5 is located at the accommodated position, the toner handle 85Y is located between the toner housing 80Y and the belt 91.

4. Detail of Image Forming Apparatus 1

The image forming apparatus 1 will be described in detail by referring to FIGS. 3 and 8 to 11.

Figure 11:
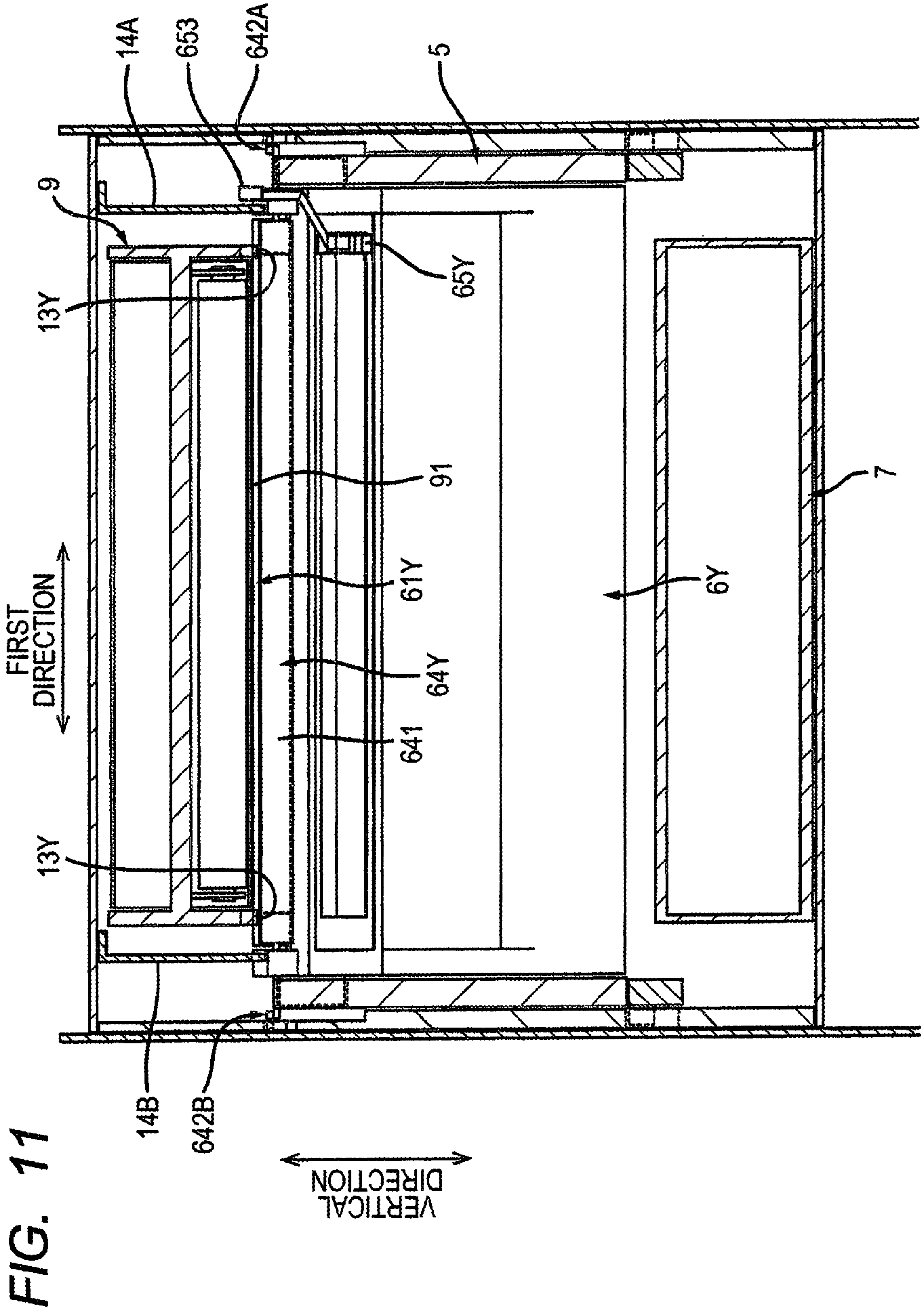
FIG. 11 is an explanatory diagram for illustrating the positional relationship between the drum cover and a positioning plate in a first direction and the positional relationship between a wire cleaner and the positioning plate in the first direction.

The image forming apparatus 1 further includes a guide 12 (see FIG. 3), a plurality of protrusions 13Y, 13M, 13C, and 13K (see FIG. 3), a first positioning plate 14A (see FIG. 11), and a second positioning plate 14B (see FIG. 11).

4.1 Guide 12

As shown in FIG. 3, the guide 12 is located in the main housing 2. The guide 12 extends in the movement direction of the drawer 5. When the drum cartridge 6Y is attached to the drawer 5 and the drawer 5 moves from the pulled-out position (see FIG. 3) to the accommodated position (see FIG. 1), the guide 12 guides the arm 642A of the drum cover 64Y.

More specifically, as shown in FIG. 3, in a state where the drum cartridge 6Y is attached to the drawer 5 and the drawer 5 is located at the pulled-out position, the drum cover 64Y is located at the first position.

Figure 8:
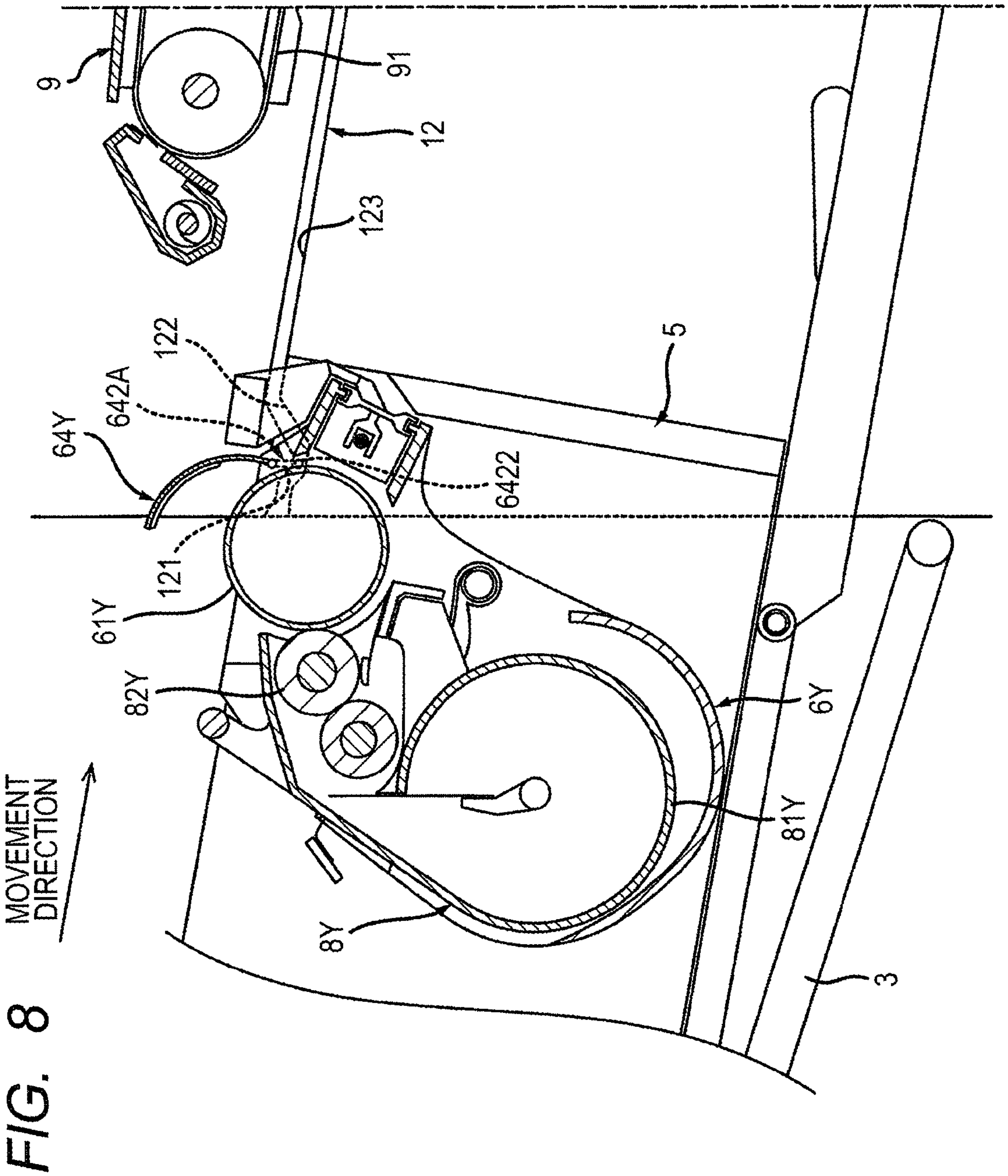
FIG. 8 is an explanatory diagram for illustrating the interlocking of the movement of the drawer from the pulled-out position to the accommodated position and the movement of the drum cover from the first position to the second position, and shows a state where the drum cover is rotationally moved from the first position to a position between the first position and the second position.
Figure 9:
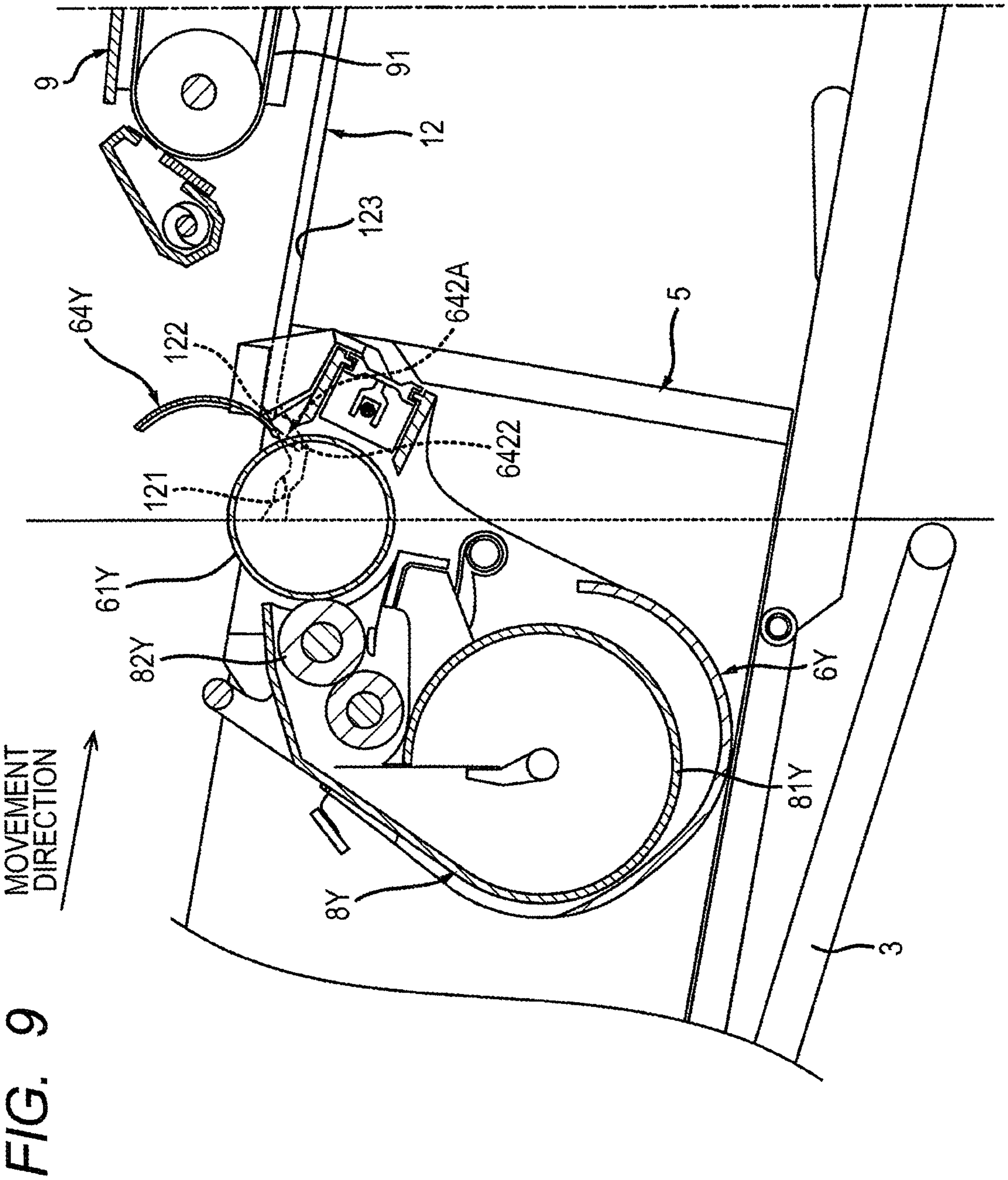
FIG. 9 is another explanatory diagram for illustrating the interlocking of the movement of the drawer from the pulled-out position to the accommodated position and the movement of the drum cover from the first position to the second position, and shows a state where the drum cover is rotationally moved toward the second position from the position between the first position and the second position.
Figure 10:
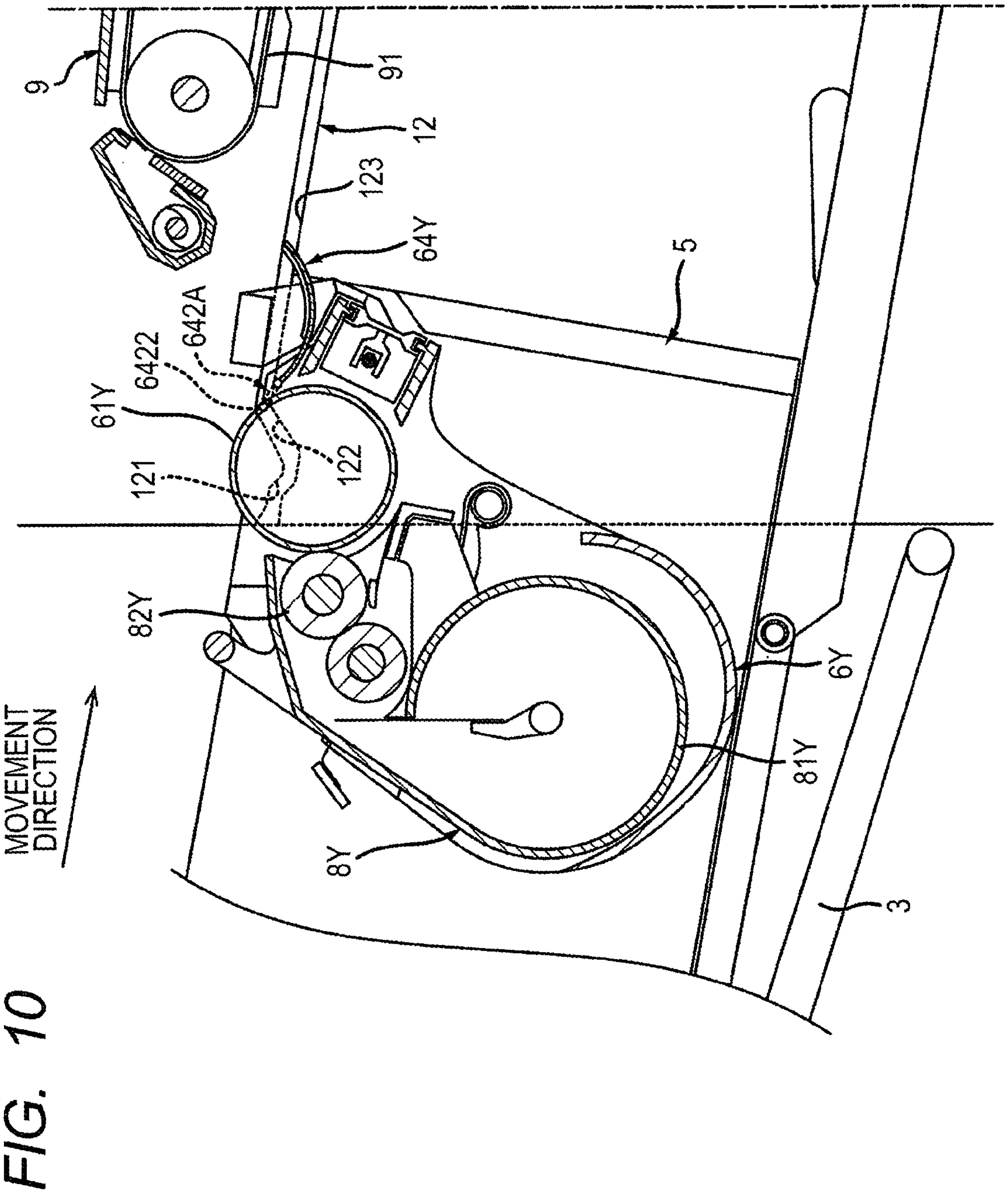
FIG. 10 is another explanatory diagram for illustrating the interlocking of the movement of the drawer from the pulled-out position to the accommodated position and the movement of the drum cover from the first position to the second position, and shows a state where the drum cover is located at the second position.

Next, as shown in FIGS. 8 to 10, when the drum cartridge 6Y is attached to the drawer 5 and the drawer 5 moves from the pulled-out position (see FIG. 3) to the accommodated position (see FIG. 1), the protrusion 6422 of the arm 642A fits in the guide 12. Thus, the arm 642A is guided by the guide 12. The arm 642A is guided by the guide 12, which causes the drum cover 64Y to rotationally move from the first position to the second position. Thus, when the drum cartridge 6Y is attached to the drawer 5 and the drawer 5 moves from the pulled-out position to the accommodated position, the drum cover 64Y moves from the first position to the second position in conjunction with the movement of the drawer 5.

More specifically, as shown in FIG. 8, the guide 12 includes a guide surface 121, a guide surface 122, a guide surface 123, and a plurality of recesses 124Y, 124M, 124C, and 124K (see FIG. 3).

The guide surface 121 is located upstream of the belt 91 in the movement direction in which the drawer 5 moves from the pulled-out position toward the accommodated position. The guide surface 121 extends in a direction crossing the movement direction in which the drawer 5 moves from the pulled-out position toward the accommodated position. The guide surface 121 is inclined relative to the movement direction in which the drawer 5 moves from the pulled-out position toward the accommodated position.

When the drawer 5 moves from the pulled-out position to the accommodated position, the protrusion 6422 of the drum cover 64Y contacts the guide surface 121. Then, the protrusion 6422 is guided along the guide surface 121 to cause the drum cover 64Y at the first position to rotationally move toward the second position. In other words, the guide surface 121 causes the drum cover 64Y at the first position to rotationally move toward the second position. The drum cover 64Y is caused to rotationally move by the guide surface 121 from the first position to a position between the first position and the second position.

The guide surface 122 is located between the guide surface 121 and the belt 91 in the movement direction in which the drawer 5 moves from the pulled-out position toward the accommodated position. The guide surface 122 is located between the guide surface 121 and the guide surface 123 in the movement direction. The guide surface 122 extends in a direction crossing the movement direction in which the drawer 5 moves from the pulled-out position toward the accommodated position. The guide surface 122 is inclined relative to the movement direction in which the drawer 5 moves from the pulled-out position toward the accommodated position and is inclined in an opposite direction from the guide surface 121.

As shown in FIG. 9, the protrusion 6422 of the drum cover 64Y caused to rotationally move by the guide surface 121 contacts the guide surface 122. Then, as shown in FIG. 10, the protrusion 6422 is guided along the guide surface 122 to cause the drum cover 64Y at the position between the first position and the second position to rotationally move toward the second position. In other words, the guide surface

122 causes the drum cover 64Y at the position between the first position and the second position to rotationally move toward the second position.

The guide surface 123 is located downstream of the guide surface 122 in the movement direction in which the drawer 5 moves from the pulled-out position toward the accommodated position. The guide surface 123 extends in the movement direction. The guide surface 123 is connected to the guide surface 122. The guide surface 123 maintains, at the second position, the drum cover 64Y that is rotationally moved by the guide surface 121 and the guide surface 122. More specifically, the guide surface 123 maintains the drum cover 64Y at the second position until the drawer 5 reaches the second accommodated position (see FIG. 2).

As shown in FIG. 3, the recesses 124Y, 124M, 124C, and 124K are aligned in a direction in which the guide 12 extends. The recesses 124Y, 124M, 124C, and 124K are located between the guide surface 123 and the belt 91.

When the drum cartridge 6Y is attached to the drawer 5 and the drawer 5 moves from the second accommodated position (see FIG. 2) to the accommodated position (see FIG. 1), the recess 124Y receives the protrusion 6422 (see FIG. 4) of the drum cover 64Y.

The description of the recess 124Y is also applied to the recesses 124M, 124C, and 124K. Thus, the descriptions of the recesses 124M, 124C, and 124K will be omitted.

4.2 Protrusions 13Y, 13M, 13C, 13K

The protrusions 13Y, 13M, 13C, and 13K are located in the main housing 2. The protrusions 13Y, 13M, 13C, and 13K are aligned with the belt 91 in the first direction (see FIGS. 3 and 11). The protrusions 13Y, 13M, 13C, and 13K protrude farther downward than the belt 91. The protrusions 13Y, 13M, 13C, and 13K may extend from the belt unit 9. In other words, the belt unit 9 may include the protrusions 13Y, 13M, 13C, and 13K.

As shown in FIG. 1, in a state where the drum cartridge 6Y is attached to the drawer 5 and the drawer 5 is located at the accommodated position and the drum cover 64Y is located at the second position, the protrusion 13Y contacts the drum cover 64Y. Thus, in a state where the drum cartridge 6Y is attached to the drawer 5 and the drawer 5 is located at the accommodated position, the drum cover 64Y is located at the second position.

In a state where the drum cartridge 6Y is attached to the drawer 5 and the drawer 5 is located at the accommodated position and the drum cover 64Y is located at the second position, the drum cover 64Y is located downstream of the photosensitive drum 61Y in the movement direction in which the drawer 5 moves from the pulled-out position toward the accommodated position. In a state where the drum cartridge 6Y is attached to the drawer 5 and the drawer 5 is located at the accommodated position and the drum cover 64Y is located at the second position, the drum cover 64Y is located at the opposite side of the development roller 82Y with respect to the photosensitive drum 61Y. In a state where the drum cartridge 6Y is attached to the drawer 5 and the drawer 5 is located at the accommodated position and the drum cover 64Y is located at the second position, the drum cover 64Y is located between the charger 62Y and the belt 91.

The description of the protrusion 13Y is also applied to the protrusions 13M, 13C, and 13K. Thus, the descriptions of the protrusions 13M, 13C, and 13K will be omitted.

4.3 Positioning Plates 14A, 14B

As shown in FIG. 11, the positioning plate 14A is located in the main housing 2. The positioning plate 14A is located at one side of the belt unit 9 in the first direction. The positioning plate 14A extends in a vertical direction. In a state where the drum cartridge 6Y is attached to the drawer 5 and the drawer 5 is located at the accommodated position, the positioning plate 14A is located at one end of the photosensitive drum 61Y in the first direction. In a state where the drum cartridge 6Y is attached to the drawer 5 and the drawer 5 is located at the accommodated position, the positioning plate 14A contacts the one end of the photosensitive drum 61Y in the first direction. In a state where the drum cartridge 6Y is attached to the drawer 5 and the drawer 5 is located at the accommodated position, the positioning plate 14A positions the one end of the photosensitive drum 61Y in the first direction relative to the main housing 2.

The positioning plate 14B is located in the main housing 2. The positioning plate 14B is located away from the positioning plate 14A in the first direction. The positioning plate 14B is located at the other side of the belt unit 9 in the first direction. The positioning plate 14B extends in the vertical direction. In a state where the drum cartridge 6Y is attached to the drawer 5 and the drawer 5 is located at the accommodated position, the positioning plate 14B is located at the other end of the photosensitive drum 61Y in the first direction. In a state where the drum cartridge 6Y is attached to the drawer 5 and the drawer 5 is located at the accommodated position, the positioning plate 14B contacts the other end of the photosensitive drum 61Y in the first direction. In a state where the drum cartridge 6Y is attached to the drawer 5 and the drawer 5 is located at the accommodated position, the positioning plate 14B positions the other end of the photosensitive drum 61Y in the first direction relative to the main housing 2.

In a state where the drum cartridge 6Y is attached to the drawer 5 and the drawer 5 is located at the accommodated position, the cover main body 641 of the drum cover 64Y is located between the positioning plate 14A and the positioning plate 14B in the first direction.

In a state where the drum cartridge 6Y is attached to the drawer 5 and the drawer 5 is located at the accommodated position, the arm 642A of the drum cover 64Y is located at the opposite side of the cover main body 641 with respect to the positioning plate 14A in the first direction. In a state where the drum cartridge 6Y is attached to the drawer 5 and the drawer 5 is located at the accommodated position, the arm 642B of the drum cover 64Y is located at the opposite side of the cover main body 641 with respect to the positioning plate 14B in the first direction.

In a state where the drum cartridge 6Y is attached to the drawer 5 and the drawer 5 is located at the accommodated position and the wire cleaner 65Y is located at the standby position, the handle 653 of the wire cleaner 65Y is located at the opposite side of the positioning plate 14B with respect to the positioning plate 14A in the first direction.

5. Operations and Effects (1) According to the image forming apparatus 1, as shown in FIG. 3, in a state where the drum cartridge 6Y is attached to the drawer 5 and the drawer 5 is located at the pulled-out position, the drum cover 64Y covers a part of the circumferential surface of the photosensitive drum 61Y.

As a result, in a state where the drum cartridge 6Y is attached to the drawer 5 and the drawer 5 is located at the pulled-out position, the surface of the photosensitive drum 61Y is protected.

According to the image forming apparatus 1, as shown in FIG. 1, in a state where the toner cartridge 8Y is attached to the drum cartridge 6Y and the drum cover 64Y is located at the second position, the drum cover 64Y is located at the opposite side of the toner cartridge 8Y with respect to the photosensitive drum 61Y.

Thus, the drum cover 64Y does not face the toner cartridge 8Y in a state where the drum cover 64Y is located at the first position (see FIG. 3) or the drum cover 64Y is located at the second position (see FIG. 1).

Thus, when the toner cartridge 8Y is attached to the drum cartridge 6Y or when the toner cartridge 8Y is detached from the drum cartridge 6Y, it is possible to suppress a contact between the toner cartridge 8Y and the drum cover 64Y.

As a result, the toner cartridge 8Y is smoothly attached to the drum cartridge 6Y, or the toner cartridge 8Y is smoothly detached from the drum cartridge 6Y.

(2) According to the image forming apparatus 1, as shown in FIG. 1, in a state where the drum cartridge 6Y is attached to the drawer 5 and the drawer 5 is located at the accommodated position and the drum cover 64Y is located at the second position, the drum cover 64Y is located between the charger 62Y and the belt 91.

Thus, in a state where the drum cartridge 6Y is attached to the drawer 5 and the drawer 5 is located at the accommodated position, the drum cover 64Y is located at the second position by using the space between the charger 62Y and the belt 91.

(3) According to the image forming apparatus 1, as shown in FIGS. 8 to 10, when the drum cartridge 6Y is attached to the drawer 5 and the drawer 5 moves from the pulled-out position to the accommodated position, the drum cover 64Y moves from the first position to the second position in conjunction with the movement of the drawer 5.

Thus, the drum cover 64Y is reliably moved from the first position to the second position by an operation of moving the drawer 5 from the pulled-out position to the accommodated position.

Thus, it is possible to suppress a situation that the drawer 5 is located at the accommodated position in a state where the drum cover 64Y is located at the first position.

(4) According to the image forming apparatus 1, as shown in FIG. 1, the belt unit 9 has the protrusion 13Y. The protrusion 13Y protrudes downward from the belt 91. In a state where the drum cartridge 6Y is attached to the drawer 5 and the drawer 5 is located at the accommodated position and the drum cover 64Y is located at the second position, the protrusion 13Y contacts the drum cover 64Y Thus, in a state where the drum cartridge 6Y is attached to the drawer 5 and the drawer 5 is located at the accommodated position, a contact between the belt 91 and the drum cover 64Y located at the second position is suppressed.

(5) According to the image forming apparatus 1, as shown in FIG. 5A, in a state where the drum cartridge 6Y is attached to the drawer 5, the handle 653 of the wire cleaner 65Y is located at a higher position than the charger 62Y.

Thus, if the drawer 5 is located at the pulled-out position (see FIG. 3), the wire cleaner 65Y is moved by gripping the handle 653 without detaching the drum cartridge 6Y from the drawer 5.

Thus, the wire 621 is easily cleaned.

Further, when the user moves the wire cleaner 65Y, the drum cover 64Y is located at the first position. Thus, it is possible to suppress the user touching the surface of the photosensitive drum 61Y.

(6) As shown in FIG. 6, in a state where the drum cover 64Y is located at the second position and the wire cleaner 65Y is located at the standby position, the handle 653 of the wire cleaner 65Y is aligned with the drum cover 64Y in the first direction.

Thus, if the drum cover 64Y moves from the first position (see FIG. 4) to the second position in a state where the wire cleaner 65Y is not returned to the standby position, the drum cover 64Y contacts the handle 653 of the wire cleaner 65Y and stops before reaching the second position.

This makes the operator to notice that the wire cleaner 65Y is not returned to the standby position.

This suppresses a situation that the drum cartridge 6Y is used for image formation in a state where the wire cleaner 65Y is not returned to the standby position.

According to the above-described image forming apparatus, in a configuration that the belt is located above the photosensitive drum in a state where the drum cartridge is attached to the drawer and the drawer is located at the accommodated position, the surface of the photosensitive drum is protected.

6. Modification

While the disclosure has been described in detail with reference to the above aspects thereof, it would be apparent to those skilled in the art that various changes and modifications may be made therein without departing from the scope of the claims.

(1) For example, the toner cartridge 8Y may not have the development roller 82Y. In this case, the drum cartridge 6Y may have the development roller 82Y.

(2) The belt 91 may not be an intermediate transfer belt. The belt 91 may be a sheet conveyance belt that conveys the sheet S. In this case, the image forming apparatus 1 does not include the transfer roller 10. The sheet from the sheet accommodating portion 4 passes between the photosensitive drums 61Y, 61M, 61C, 61K and the belt 91. The transfer roller 92Y transfers the toner on the photosensitive drum 61Y to the sheet S conveyed by the belt 91. The transfer roller 92M transfers the toner on the photosensitive drum 61M to the sheet S conveyed by the belt 91. The transfer roller 92C transfers the toner on the photosensitive drum 61C to the sheet S conveyed by the belt 91. The transfer roller 92K transfers the toner on the photosensitive drum 61K to the sheet S conveyed by the belt 91.

What is claimed is:

1. A cartridge comprising:

a drum cartridge comprising:

a photosensitive drum being rotatable about a first axis extending in a first direction; and a drum cover being movable relative to the photosensitive drum between a first position at which the drum cover covers a part of a circumferential surface of the photosensitive drum, and a second position at which the drum cover does not cover the part of the circumferential surface of the photosensitive drum; and a toner cartridge comprising a toner storage portion configured to store toner to be supplied to the photosensitive drum;

wherein the drum cartridge further comprises a toner cartridge guide extending in a second direction crossing the first direction;

wherein the toner cartridge guide guides the toner cartridge to move in the second direction when the toner cartridge is being attached to the drum cartridge;

wherein a distance from the toner cartridge guide to the drum cover at the second position is longer than a distance from the toner cartridge guide to the drum cover at the first position;

wherein the drum cartridge has a drum side and an opposite side in an extending direction in which the drum cartridge extends, the photosensitive drum being located at the drum side of the drum cartridge, and wherein the toner cartridge is attached to the drum cartridge from the drum side of the drum cartridge.

2. The cartridge according to claim 1, wherein the drum cover is rotatable about a second axis extending in the first direction between the first position and the second position.

3. The cartridge according to claim 2, wherein, in a case where the toner cartridge is attached to the drum cartridge, the second axis is located on an opposite side of the toner cartridge with respect to the photosensitive drum.

4. The cartridge according to claim 1, wherein the toner cartridge further comprises a development roller configured to supply toner stored in the toner storage portion to the photosensitive drum; and wherein, in a case where the toner cartridge is attached to the drum cartridge and the drum cover is at the first position, the photosensitive drum is located between the drum cover and the development roller.

5. The cartridge according to claim 4, wherein, in a case where the toner cartridge is attached to the drum cartridge, the development roller contacts the photosensitive drum.

6. The cartridge according to claim 1, wherein the drum cartridge further comprises a holder configured to accommodate the toner cartridge;

wherein the holder comprises:

a first drum side plate located at a first end of the drum cartridge in the first direction; and a second drum side plate located at a second end of the drum cartridge in the first direction, the first drum side plate having an inner surface facing the second drum side plate;

wherein the toner cartridge is attachable to a space between the first drum side plate and the second drum side plate; and wherein the toner cartridge guide is disposed on the inner surface of the first drum side plate.

7. The cartridge according to claim 1, further comprising:

a charger including a wire; and a wire cleaner for cleaning the wire of the charger, the wire cleaner including a handle for moving the wire cleaner, wherein, in a state where the drum cover is located at the first position, the wire cleaner is movable in the first direction from a standby position where the handle is located at one side of the drum cover in the first direction; and wherein, in a state where the drum cover is located at the second position and the wire cleaner is located at the standby position, the handle of the wire cleaner is aligned with the drum cover in the first direction.

8. The cartridge according to claim 1, wherein the toner cartridge further comprises a toner handle for carrying the toner cartridge;

wherein the toner handle protrudes from the toner storage portion toward a particular direction; and wherein the part of the circumferential surface of the photosensitive drum faces toward the particular direction in a state where the drum cover is located at the second position.

9. A cartridge comprising:

a drum cartridge comprising:

a photosensitive drum being rotatable about a first axis extending in a first direction; and a drum cover being movable relative to the photosensitive drum between a first position at which the drum cover covers a part of a circumferential surface of the photosensitive drum, and a second position at which the drum cover does not cover the part of the circumferential surface of the photosensitive drum; and a toner cartridge comprising a toner storage portion configured to store toner to be supplied to the photosensitive drum;

wherein the drum cartridge further comprises:

a holder configured to accommodate the toner cartridge, comprising:

a first drum side plate located at a first end of the drum cartridge in the first direction; and a second drum side plate located at a second end of the drum cartridge in the first direction;

wherein the toner cartridge is attachable to a space between the first drum side plate and the second drum side plate; and wherein a distance from the toner cartridge attached to the space to the drum cover at the second position is longer than a distance from the toner cartridge attached to the space to the drum cover at the first position, wherein the drum cartridge has a drum side and an opposite side in an extending direction in which the drum cartridge extends, the photosensitive drum being located at the drum side of the drum cartridge; and wherein the toner cartridge is attached to the drum cartridge from the drum side of the drum cartridge.

10. The cartridge according to claim 9, wherein the drum cover is rotatable about a second axis extending in the first direction between the first position and the second position.

11. The cartridge according to claim 10, wherein, in a case where the toner cartridge is attached to the drum cartridge, the second axis is located on an opposite side of the toner cartridge with respect to the photosensitive drum.

12. The cartridge according to claim 9, wherein the toner cartridge further comprises a development roller configured to supply toner stored in the toner storage portion to the photosensitive drum; and wherein, in a case where the toner cartridge is attached to the drum cartridge and the drum cover is at the first position, the photosensitive drum is located between the drum cover and the development roller.

13. The cartridge according to claim 12, wherein, in a case where the toner cartridge is attached to the drum cartridge, the development roller contacts the photosensitive drum.

14. A cartridge comprising:

a drum cartridge comprising:

a photosensitive drum being rotatable about a first axis extending in a first direction; and a drum cover being movable relative to the photosensitive drum between a first position at which the drum cover covers a part of a circumferential surface of the photosensitive drum, and a second position at which the drum cover does not cover the part of the circumferential surface of the photosensitive drum; and a toner cartridge comprising a toner storage portion configured to store toner to be supplied to the photosensitive drum;

wherein the drum cartridge further comprises:

a holder configured to accommodate the toner cartridge, comprising:

a first drum side plate located at a first end of the drum cartridge in the first direction; and a second drum side plate located at a second end of the drum cartridge in the first direction;

wherein the toner cartridge is attachable to a space between the first drum side plate and the second drum side plate;

wherein the toner cartridge moves along a cartridge guide extending in a second direction crossing the first direction while attaching to and detaching from the space between the first drum side plate and the second drum side plate; and wherein a distance from the cartridge guide to the drum cover at the second position is longer than a distance from the cartridge guide to the drum cover at the first position;

wherein the drum cartridge has a drum side and an opposite side in an extending direction in which the drum cartridge extends, the photosensitive drum being located at the drum side of the drum cartridge; and wherein the toner cartridge is attached to the drum cartridge from the side of the drum cartridge.

15. The cartridge according to claim 14, wherein the drum cover is rotatable about a second axis extending in the first direction between the first position and the second position.

16. The cartridge according to claim 15, wherein, in a case where the toner cartridge is attached to the drum cartridge, the second axis is located on an opposite side of the toner cartridge with respect to the photosensitive drum.

17. The cartridge according to claim 14, wherein the toner cartridge further comprises a development roller configured to supply toner stored in the toner storage portion to the photosensitive drum; and wherein, in a case where the toner cartridge is attached to the drum cartridge and the drum cover is at the first position, the photosensitive drum is located between the drum cover and development roller.

18. The cartridge according to claim 17, wherein, in a case where the toner cartridge is attached to the drum cartridge, the development roller contacts the photosensitive drum.

* * * * *